United States Patent

[11] 3,588,732

[72] Inventor Robert D. Tollefson
Richardson, Tex.
[21] Appl. No. 791,686
[22] Filed Jan. 16, 1969
[45] Patented June 28, 1971
[73] Assignee Collins Radio Company
Richardson, Tex.

[54] FREQUENCY SYNTHESIZER
18 Claims, 4 Drawing Figs.

[52] U.S. Cl. .......... 331/2, 331/16
[51] Int. Cl. .......... H03b 3/04
[50] Field of Search .......... 331/2, 16, 22, 31

[56] References Cited

UNITED STATES PATENTS 3,319,178 5/1967 Broadhead, Jr. .......... 331/2
3,435,367 3/1969 Little, Jr. .......... 331/2

*Primary Examiner*—John Kominski
*Attorneys*—Warren H. Kintzinger and Robert J. Crawford

ABSTRACT: A frequency synthesizer producing an output signal variable through predetermined uniform frequency steps of relatively small incremental value having two fixed input reference frequencies generated from, generally, a higher single frequency standard and with the two reference frequencies differing by a relatively small quantitative frequency value equal to the smallest uniform incremental value frequency adjustment step provided in a variable injection frequency output and much smaller than any frequency step adjustment available with adjustment of one phase locked loop alone of at least two phase locked loops each with selectively controlled dividers cooperatively together providing the resultant small incremental value frequency steps in the variable injection frequency output through an extended frequency range for utilizing equipment.

Patented June 28, 1971 3,588,732

4 Sheets-Sheet 1

Figure 1:
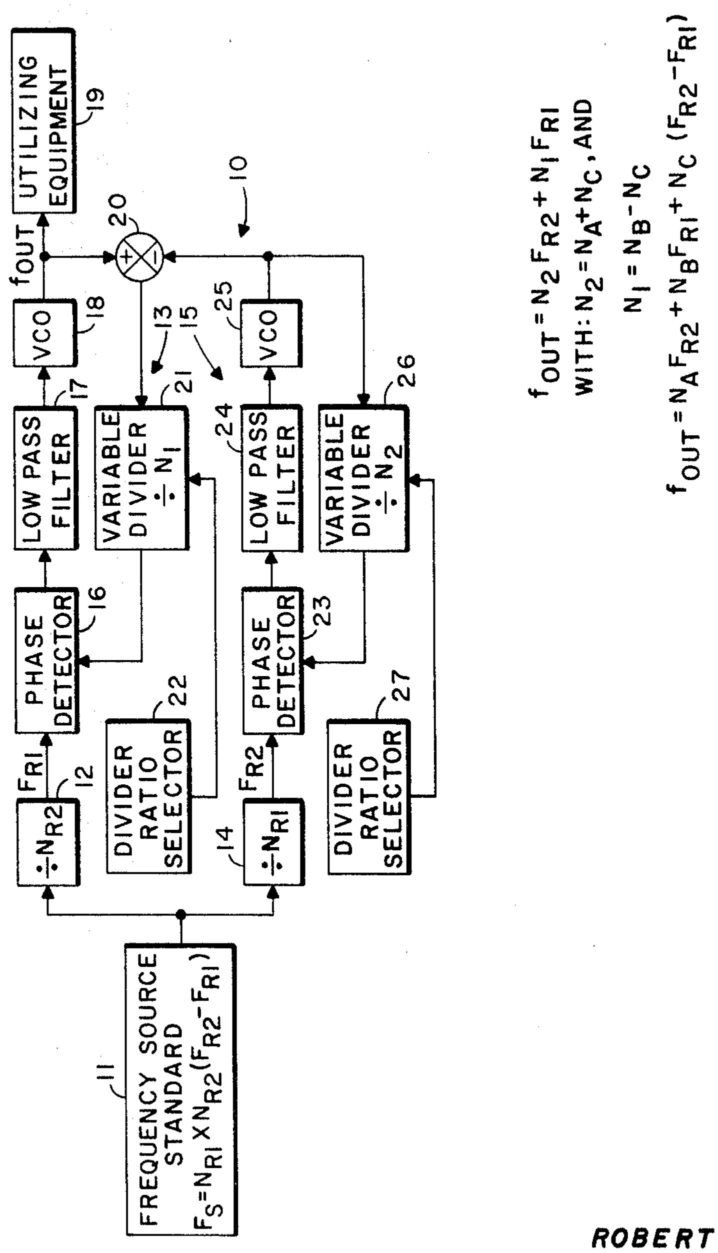

INVENTOR.
ROBERT D. TOLLEFSON

BY Warren H. Kintzinger
ATTORNEY

INVENTOR.
ROBERT D. TOLLEFSON

BY Warren H. Kintzinger
ATTORNEY

INVENTOR.
ROBERT D. TOLLEFSON

BY Warren H. Kintzinger
ATTORNEY

INVENTOR.
ROBERT D. TOLLEFSON

BY Warren H. Kintzinger
ATTORNEY

FREQUENCY SYNTHESIZER

This invention relates to frequency synthesizers, and in particular, to a multiloop frequency synthesizer with at least two reference frequencies with very close frequency spacing developed from and phase coherent with, a frequency standard and feeding individual loops subject to simultaneous step adjustment in developing step variable frequency output with minumum step adjustment equal in incremental value to the difference between the two reference frequencies.

Many existing frequency synthesizers are so arranged that a single reference frequency determines the minimum frequency change or adjustment step available with the synthesizer. This, however, limits phase locked loop servo bandwidth and does not always provide a desired level of voltage controlled oscillator quieting close in to its, or carrier, center frequency. Furthermore, the lowest spurious signal inherently present with such reference signals may prove particularly troublesome, and an undesired FM effect developed by vibration is likely at times to be objectionable. Low frequency filter requirements are excessive with many of the existing frequency signal generators not only in size, weight, and also expense, but, also as a result, with intensified adverse reliability and maintenance problems.

It is, therefore, a principal object of this invention to provide a frequency synthesizer using two reference frequencies developed from a single frequency standard each many times the minimum frequency incremental adjustable step frequency value used throughout an extended frequency adjustment range.

Another object with such a frequency synthesizer is to attain a wider phased locked loop servo bandwidth with more improved quieting of voltage controlled oscillator noise.

A further object is to move the lowest spurious frequency developed out from the minimum frequency incremental adjustment step value developed, and also to reduce adverse vibration generated FM to a minimal level.

Still another object is to enable the use of much higher frequency cutoff filters relative to those generally required thereby achieving significant savings in size, weight, and maintenance, a material improvement in reliability, and an important significant resultant minimizing of expense.

Features of this invention useful in accomplishing the above objects include, in a multiphase locked loop frequency synthesizer, at least two phase locked loops each individually fed by an individual reference frequency both of which are developed from a single frequency standard and with all these frequencies many times the minimum frequency incremental adjustment step value provided for frequency adjustment throughout an extended frequency adjustment range. Please note that the two reference frequencies are relatively closely spaced and separated by a frequency incremental value equal to the minumum frequency incremental adjustment step inherently available with the improved multiloop frequency synthesizer system.

Specific embodiments representing what are presently regarded as the best modes of carrying out the invention are illustrated in the accompanying drawings.

Figure 2:
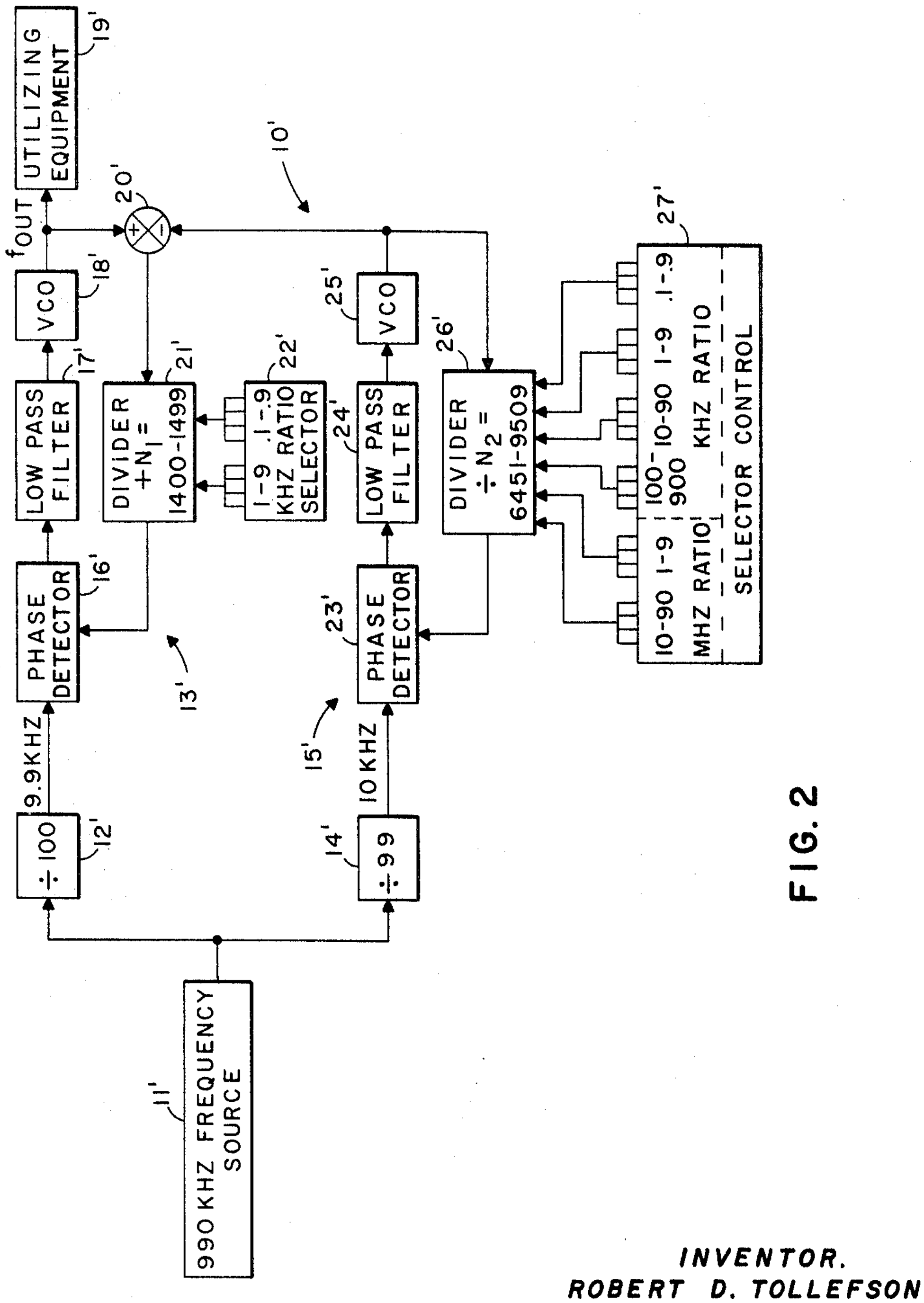
Figure 3:
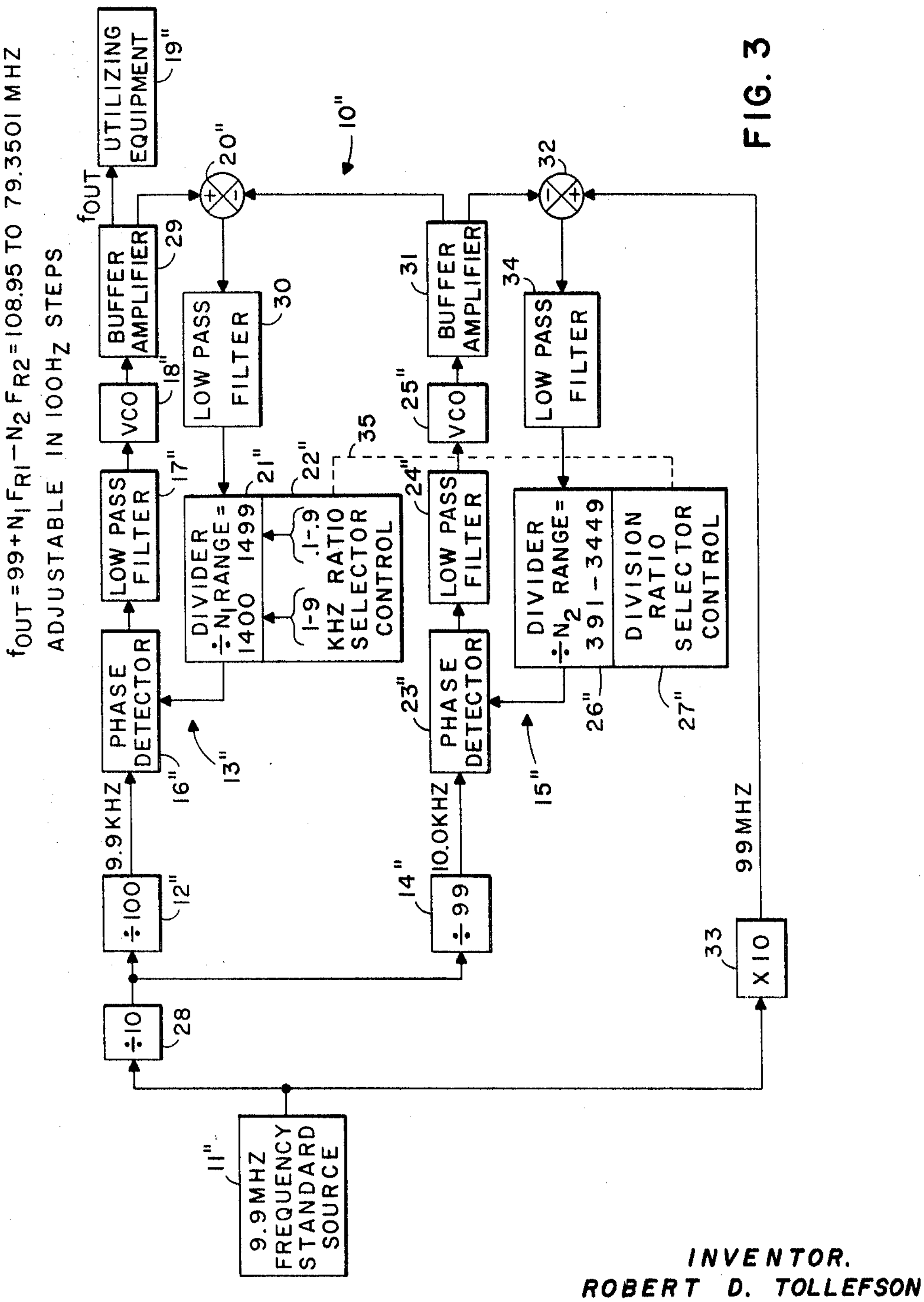
Figure 4:
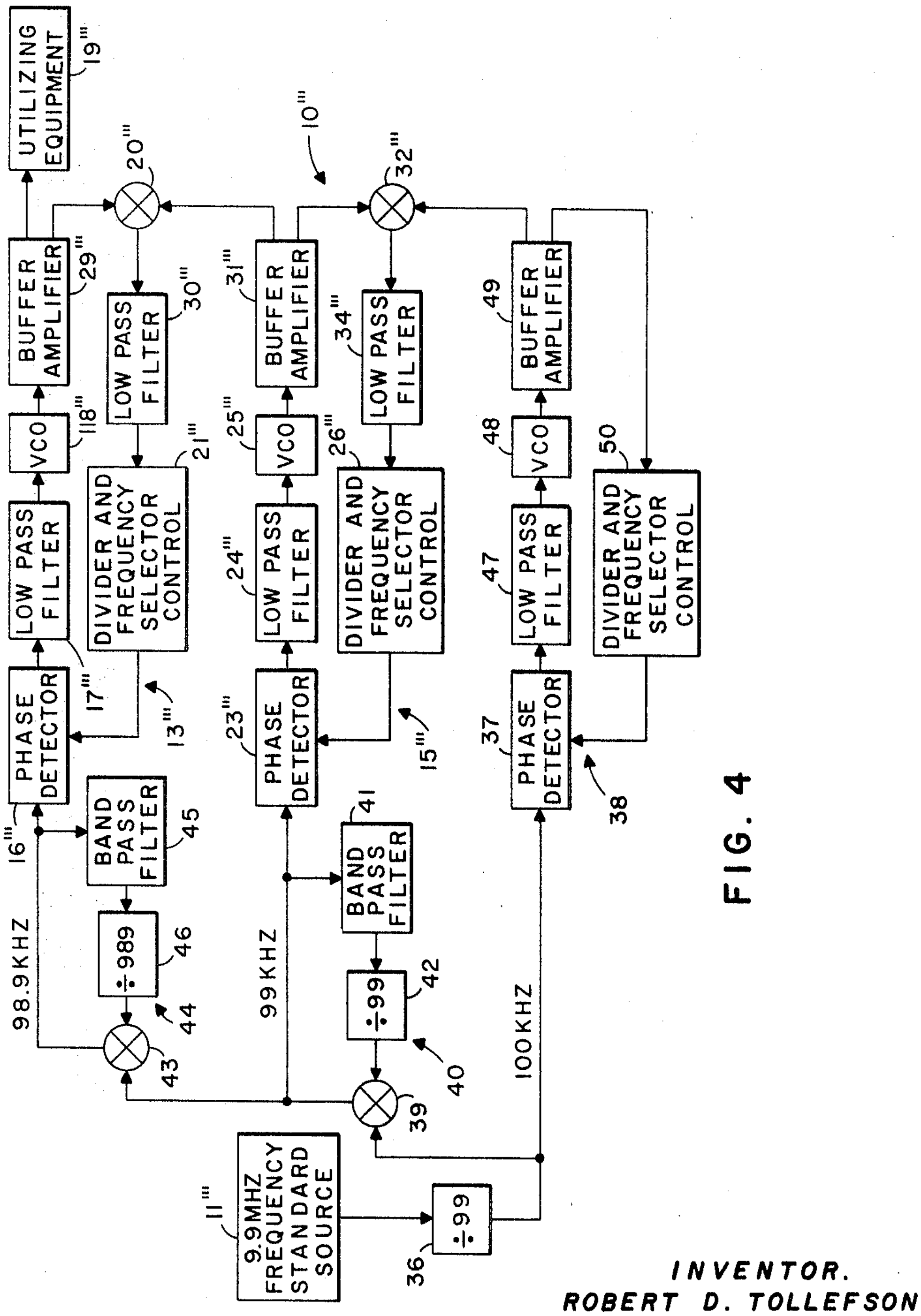

In the drawings:

FIG. 1 represents a schematic diagram of a multiphase locked loop frequency synthesizer with two-phase locked loops without specific frequencies or division ratios shown;

FIG. 2, a more specific application of a multiphase locked loop frequency synthesizer, such as shown by FIG. 1, with greater loop divider control detail;

FIG. 3, a more complex multiphase locked loop frequency synthesizer than those of FIGS. 1 and 2, with a second mixer for a second phase locked loop and a third reference signal input thereto developed from the single frequency standard therefor; and, FIG. 4, a three-phase locked loop version of the frequency synthesizer.

Referring to the drawings:

The multiphase locked loop frequency synthesizer 10 of FIG. 1 is shown to have a single frequency standard source 11 feeding a standard frequency signal through a divider 12 having a division ratio of $N_{R2}$ for developing a reference frequency $F_{R1}$ as an input to a first phase locked loop 13. The standard frequency signal from frequency standard source 11 is also applied through divider 14 with a division ratio of $N_{R1}$ for developing a reference frequency $F_{R2}$ as input to a second phase locked loop 15 of the frequency synthesizer. The reference frequency output $F_{R1}$ of divider 12 is applied as an input to phase detector 16 having an output passed to low-pass filter 17. The signal voltage passed by low-pass filter 17 is applied as a controlling voltage input to voltage controlled oscillator 18 for developing an output useful as a variable injection frequency signal for utilizing equipment 19 and also as an injection signal input to mixer 20 of phase locked loop 13 as a plus input thereto, and with a minus input from the phase locked loop 15. The output of mixer 20 is applied as an input to variable divider 21 having a division ratio identified for any one particular time as $N_1$. The variable divider 21 is controlled by inputs from divider ratio selector 22 and provides a frequency output signal as an additional second input to phase detector 16 in completing the first phase locked loop 13. In the second phase locked loop 15, the reference frequency $F_{R2}$ developed out of divider 14 is applied as an input to phase detector 23, developing an output passed to filter 24. The signal voltage passed by low-pass filter 24 is applied as a controlling voltage input to voltage controlled oscillator 25 for developing an output useful as the phase locked loop 15 subtractive, or negative, injection signal input to the mixer 20 of the first phase locked loop 13, and also in the phase locked loop 15 back to variable divider 26, with a variable division ratio identified as $N_2$. Variable divider 26 is controlled by divider ration selector 27 to develop an output applied back as an additional or second input to phase detector 23 in completing the phase locked loop 15.

With the two phase locked loop 13 and 15 and one mixer 20 embodiment generally indicated in FIG. 1, with the frequency standard source $F_S = N_{R1} \times N_{R2} (F_{R2} F_{R1})$ the plus and minus inputs of the mixer 20 could be reversed or, for that matter, they could both be additive inputs for developing desired variable injection frequency output signals for utilizing equipment 19. However, the formula shown with FIG. 1 is applicable with the plus and negative injection inputs indicated with mixer 20 as shown. With this arrangement $N_A$ is the adjustable hundred digits, $N_B$ the adjustable tens digits and $N_C$ is the least significant portion of the decade ratio and extends through a range great enough to allow incrementation over the range equal to the size of the significant reference frequency $F_{R1}$ or $F_{R2}$ whichever happens to so be. It is an inherent feature with this system that the difference between the two reference signals $F_{R1}$ and $F_{R2}$ be exactly equal to the minimum frequency adjustment step as indicated for $N_C$. Please note at this point that this system is equally applicable to other number based systems such as an octal system or any other such conveniently useable system just as readily as it is to the decade system.

With the more specific embodiment 10′ of 2, that is similar in many respects to the embodiment of FIG. 1, the corresponding block circuit sections are given primed numbers as a matter of convenience. The single frequency standard source 11′ is a 990 kHz. frequency signal source divided by 100 through diver 12′ to a reference frequency input of 9.9 kHz. for the first phase locked loop 13′.The 990 kHz. frequency signal from source 11′ is also divided by 99 through divider 14′ to a 10 kHz. signal used as the reference frequency input to the second phase locked loop 15′. The 9.9 kHz. signal is applied as one of the inputs to phase detector 16′, in the loop 13′, having an output connection through low-pass filter 17′ and the voltage controlled oscillator 18′ for developing an output frequency signal for utilizing equipment 19′ that is also applied back in the loop 13′ to mixer 20′ as a plus input thereto. The output of mixer 20′ is subject to division through divider 21' to obtain additional phase locked loop 13' input to phase detector 16'. Divider 21' is shown to have two four-wire control input connection sections from divider ratio selector 22', one providing 0.1 through 0.9 division ratio selections and the other 1 through 9 division ratio selections to in effect give 99 division ratio steps. Please note that divider 21' includes a constant division ratio factor of 1400 so that the adjustable division ratio range of the divider extends form 1400 through 1499.

In the second phase locked loop 15' the 10 kHz. reference frequency is applied as a first signal input to phase detector 23' in the loop 15'. The output of phase detector 23' is connected through low-pass filter 24' and voltage controlled oscillator 25' in developing a signal applied both as a negative input to the mixer 20' of the first phase locked loop 13' and also as an input to divider 26'. Divider 26' is shown to have six four-wire control input connection sections from divider ratio selector 27' in providing actually a much greater range of division ratio selection control in the second phase locked loop 15' than with divider 21' and selector control 22' in phase locked loop 13'. The division ratio selection steps with divider 24' and selector control 27' include 0.1 through 0.9 and 1 through 9 just as with divider 21' and selector control 22' and, in addition, 10— 90, 100—900 with respect to the kHz. range, and in the MHz. range 1—9 and 10 through 90. While this provides a greater range capability in division ratios available than the division ratio adjustable range actually used in this embodiment that is a range, with a division ratio constant included in divider 26' of 6451 through 9509.

It is important to note that the 9.9 kHz. and the 10 kHz. reference frequency signals that are developed as inputs to the first and second phase locked loops 13' and 15', respectively, are separated by the relatively small frequency step incremental value of 100 Hz. Further, it is important to note that cooperative, and most of the time simultaneous, switching of divider ratios in the divider 21' and 26' is such as to provide in the frequency output developed for utilizing equipment a full range of frequency adjustment from 108.9500 mHz. down to 79.3501 mHz. by 100 Hz. steps. The 100 Hz. frequency difference between the 9.9 kHz. and 10 kHz. reference frequency signals and the 100 Hz. frequency incremental value step adjustment capability through the desired adjustment range of frequencies is, quite advantageously, a much lower frequency value by factors of 99 and 100 from the respective reference frequencies, and much more with respect to the frequency standard source 11'. The higher reference frequencies allow wider loop servo bandwidths thereby giving more quieting to VCO noise close in to the respective center or carrier frequency and moves the lowest spurious out from 100 Hz. to 9.9 kHz. from the carrier frequency. This also, advantageously, allows for use of higher frequency cutoff filters in the frequency synthesizer thereby minimizing filter size, weight and cost requirements. Further, each 100 Hz. incremental step adjusted injection frequency signal out is a very accurate stable frequency signal since they are all phase locked to the signal of the frequency standard source 11'.

Referring now to the frequency synthesizer embodiment 10'' of FIG. 3 those elements the same, or at least similar, to the corresponding elements or block circuit sections of FIGS. 1 and 2 will be given double primed numbers and new elements new numbers. In this embodiment the single frequency standard source 11' generates a 9.9 mHz. frequency signal that is divided by 10 through divider 28 to provide a 990 kHz. frequency signal divided further by 100 through divider 12'' to a reference frequency input of 9.9 kHz. for the first phase locked loop 13', and by 99 through divider 14'' to a reference frequency input of 10 kHz. for the second phase locked loop 15''. With this embodiment just as with the embodiment of FIG. 2, the 9.9 kHz. signal is applied to phase detector 16'' in the first loop 13''. The output of detector 16'', however, is connected through low-pass filter 17'' and VCO 18'' is a buffer amplifier 29 having two output connections, one the frequency output connection to utilizing equipment 19'' and the other output connected back in loop 13'' as an additive input to mixer 20''. The output of mixed 20'' is then passed through low-pass filter 30, in the loop 13'', to divider 21'' that is division ratio controlled by division ratio selector 22'' through a ratio range of 1400 to 1499 in providing the desired additional frequency input from the loop 13'' to phase detector 16''.

In the second phase locked loop 15'' the 10 kHz. reference frequency is applied as an input to phase detector 23'' with the output therefrom passed in loop 15'' through low-pass filter 24'' and VCO 25'' to buffer amplifier 31. The buffer amplifier 31 has two output connections, one as a subtractive input to mixer 20'' and the other output connected as a subtractive input to mixer 32, also newly added in loop 15'' from the embodiments of FIGS. 1 and 2. The 9.9 mHz. signal of frequency standard source 11'' is multiplied by a factor of 10 through multiplier 33 to provide a 99 mHz. additive signal input to mixer 32. The output of mixer 32 is applied through low-pass filter 34, in loop 15'', to divider 26'' that is division ratio controlled by division ratio selector 27'' through a ratio range of 391 to 3449 in providing the desired additional frequency input from the loop 15'' to phase detector 23''. Please note that the division ratio selectors 22'' and 27'' may be interconnected by a drive interconnection 35 for coordinated frequency output step selection control With the embodiment of FIG. 3 and the two phase locked loop output frequencies combined in mixer 20'' of loop 13'', the resulting output frequency equation is:

$$f_{out} = 99\text{ mHz.} + [N_1(9.9\text{ kHz.} - N_2(10\text{ kHz.})]$$
$$= 108.95\text{ mHz. to } 79.3501\text{ mHz.}$$

In these digitally controlled phase locked loops the controlling variables are the divider ratios $N_1$ and $N_2$. From the above equation it is realized that 100 Hz. increments are obtained by increasing or decreasing $N_2$ and $N_1$ together. That is, if $N_1$ and $N_2$ are each increased by one the bracketed term decreases by one (9.9 kHz. −10 kHz.) or 100 Hz. Both the 100 Hz. and the 1000 Hz. increments are obtained by this general method with 0.1 kHz. control lines being used in both dividers (cross refer to greater divider and division ratio control detail shown with FIG. 2). The 10 kHz., 100 kHz., 1 mHz. and 10 mHz. increments are obtained by holding $N_1$ constant and varying $N_2$ only. Thus, with this embodiment, the standard frequency and all fixed injection frequencies afford generation of the full desired range of frequencies by 100 Hz. increments with a single multiplier and digital frequency dividers. This is accomplished through interaction of phase locked loops operating at 9.9 kHz. and above with, inherently, good short term stability, fast lock-on time, and low susceptibility to mechanical disturbances.

A three-phase locked loop frequency synthesizer 10''' embodiment is presented in FIG. 4 with similar elements to those of FIG. 3 given triple primed numbers and new elements new numbers. With this system the 9.9 mHz. signal of frequency standard source 11''' is divided by 99 through divider 36 to a 100 kHz. reference frequency signal applied as an input to phase detector 37 of an additional third phase locked loop 38. The 100 kHz. signal is also applied as an input to mixer 39 of an additional 99 kHz. reference frequency deriving loop 40. This is with the 99 kHz. reference frequency signal output passed as an input to phase detector 23''' of phase locked loop 15''' and also back in the loop through band-pass filter 41 and a 99 ratio divider 42 to mixer 39 as the second input thereto. The 99 kHz. reference frequency is also applied as an input to mixer 43 of still another loop 44, a 98.9 kHz. reference frequency deriving loop much like loop 40. The 98.9 kHz. output of loop 44 is applied both as a reference frequency input to phase detector 16''' and also in the loop back through band-pass filter 45 and 98.9 division ratio divider 46 as the second input to mixer 43.

The third phase locked loop 38 includes an output connection of phase detector 37 to and through low-pass filter 47 and VCO 48 to buffer amplifier 49. A first output of buffer amplifier 49 is connected as a second input to mixer 32''' of the second phase locked loop 15''', and the second output of amplifier 49 is connected back in loop 38 through divider and frequency selector control 50 as the second input to phase detector 37. With this embodiment the divider and frequency selector controls 21''', 26''' and 50 are cooperatively useable together in varying combinations to provide the desired adjustable operational range of stepped frequencies out to utilizing equipment much the same as with the two-phased locked loop embodiments. Please note, however, that the addition of the third phase locked loop 38 in the system lessens the capability requirements otherwise imposed on the divider and frequency selector control 26''' that, as a result, may be much less complex. Further, the additiveness or subtractiveness of various inputs of mixers 20''', 32''', 39 and 43 in the various loops is not indicated since the sum or difference frequency may by the frequency utilized in specific implementations as may be appropriate to particular equipment needs.

Whereas this invention is here illustrated and described with respect to several specific embodiments thereof, it should be realized that various changes may be made without departing from the essential contributions to the art made by the teachings hereof.

I claim:

1. A frequency synthesizer including at least a first frequency adjustable circuit section with a first voltage controlled oscillator; a second frequency adjustable circuit section with a second voltage controlled oscillator and signal coupled to signal feed said first frequency adjustable circuit section; a first frequency incremental ratio step adjusting means loop with said first frequency adjustable circuit section; a second frequency incremental ratio step adjusting means loop with said second frequency adjustable circuit section; with some of the frequency incremental ratio steps of said first and second frequency adjustable circuit sections being of equal ratio step value between the sections; a frequency standard source; first and second frequency deriving circuit means connected to said frequency standard source and to said first frequency adjustable circuit section and to said second frequency adjustable circuit section, respectively; with the frequencies of said first and second frequency deriving circuit means separated by a relatively small quantitative frequency value; an adjustable frequency signal output connection of the frequency synthesizer extending from said first frequency adjustable circuit section wherein said frequency synthesizer is adjustable through a range of frequency signal output steps appearing at said output connection and with frequency signal output steps each uniformly equal in frequency value to said relatively small quantitative frequency value in response to simultaneous minimum ratio stepping of said first and second frequency incremental ratio step adjusting means.

2. The frequency synthesizer of claim 1 wherein, said first frequency adjustable circuit section with said first frequency incremental ratio step adjusting means loop is a first phase locked loop; and said second frequency adjustable circuit section with said second frequency incremental ratio step adjusting means loop is a second phase locked loop.

3. The frequency synthesizer of claim 2 wherein, the frequency incremental ratio step adjusting means of the phase locked loops is based on a decade numbering system.

4. The frequency synthesizer of claim 3 wherein, said first and second frequency deriving means are frequency signal dividers.

5. The frequency synthesizer of claim 2 wherein, each of said phase locked loops include first a phase detector; and thereafter, low-pass filter means, and a voltage controlled oscillator; and in each of said phase locked loops, adjustable divider means, as said frequency incremental ratio step adjusting means, connected between the output of the voltage controlled oscillator and an additional input of the phase detector of the respective phase locked loop.

6. The frequency synthesizer of claim 5 wherein, a first mixer is included in said first phase locked loop between the voltage controlled oscillator and divider of that loop; and the output of said second phase locked loop is connected as an input to said first mixer and signal feed to said first phase locked loop.

7. The frequency synthesizer of claim 6 wherein, a second mixer is included in said second phase locked loop between the voltage controlled oscillator and divider of that loop; third frequency deriving means; and with said third frequency deriving means connected to feed an input to said second mixer.

8. The frequency synthesizer of claim 7 wherein, said third frequency deriving means is a frequency multiplier with an input connection from said frequency standard source.

9. The frequency synthesizer of claim 7 wherein, said third frequency deriving means is a third phase locked loop having circuit connective means to said frequency standard source to receive a signal input.

10. The frequency synthesizer of claim 8 wherein, said circuit connective means includes a divider.

11. The frequency synthesizer of claim 9 wherein, a reference frequency deriving loop circuit is used to develop a reference frequency input signal for at least one of said phase locked loops.

12. The frequency synthesizer of claim 11 wherein, such a reference frequency deriving loop circuit is used with each of said first and second phase locked loops.

13. The frequency synthesizer of claim 12 wherein, said reference frequency deriving loop circuits are also connected in cascade order.

14. The frequency synthesizer of claim 5 wherein, a division ratio selector control means is division control connected to said adjustable divider means in each of said phase locked loops.

15. The frequency synthesizer of claim 14 wherein, interconnecting control drive means is provided between said division ratio selector control means of the phase locked loops for coordinated frequency step adjustment control of said adjustable divider means of the loops and the frequency synthesizer.

16. The frequency synthesizer of claim 7 wherein, buffer circuit means is interposed in each of said phase locked loops between the voltage controlled oscillator, the output connection, and the circuit feedback connection of the respective phase locked loops.

17. The frequency synthesizer of claim 16 wherein, each said buffer circuit means is a buffer amplifier with one frequency signal input connection and two frequency signal output connections.

18. The frequency synthesizer of the claim 17 wherein, said first and second phase locked loops each include second low-pass filter means between the mixer of each loop and the divider of the respective loop.

UNITED STATES PATENT OFFICE

CERTIFICATE OF CORRECTION

Patent No. 3,588,732 Dated June 28, 1971

Inventor(s) Robert D. Tollefson

It is certified that error appears in the above-identified patent and that said Letters Patent are hereby corrected as shown below:

Column 2, line 35, "ration" should read -- ratio --; line 40, "$(F_{R2}F_{R1})$" should read -- $(F_{R2} - F_{R1})$ --. Column 3, line 64, " 11' " should read -- 11'' --; line 68, "13' " should read -- 13'' --. Column 4, line 18, after "99 mHz" insert -- additional --; line 30, "$[N_1$(9.9 kHz ..." should read -- $[N_1$(9.9 kHz) --; line 39, after "0.1 kHz" insert -- and 1.0 kHz --.

Signed and sealed this 16th day of May 1972.

(SEAL)
Attest:

EDWARD M.FLETCHER,JR.
Attesting Officer

ROBERT GOTTSCHALK
Commissioner of Patents